United States Patent [19]

Pryor

[11] Patent Number: 5,279,432
[45] Date of Patent: Jan. 18, 1994

[54] TEMPORARY DRAWBAR REPLACEMENT STRAP AND METHOD

[76] Inventor: Brian Pryor, 1330 Wellington Way, Apt. 2J, Decatur, Ill. 62526

[21] Appl. No.: 931,361

[22] Filed: Aug. 18, 1992

[51] Int. Cl.⁵ ............................................. B61G 5/00
[52] U.S. Cl. .............................. 213/111; 213/75 R; 280/480; 294/74
[58] Field of Search ............... 213/75 R, 111, 112, 160; 280/480, 480.1; 410/96, 97, 98, 99, 100; 294/74

[56] References Cited

U.S. PATENT DOCUMENTS

| | | | |
|---|---|---|---|
| 1,483,253 | 2/1924 | Tabler | 280/480 |
| 1,892,619 | 12/1932 | Hudgins | 213/111 |
| 3,592,502 | 7/1971 | Bolliger | 294/74 |
| 3,908,842 | 9/1975 | Place | 414/563 |
| 4,441,748 | 4/1984 | St. Germain | 294/74 |
| 4,635,804 | 1/1987 | Hanula | 213/67 R |
| 5,056,664 | 10/1991 | Demers | 410/99 X |
| 5,061,130 | 10/1991 | Gadow | 410/97 X |

FOREIGN PATENT DOCUMENTS 7713216 6/1979 Sweden ................. 410/100

Primary Examiner—Robert J. Oberleitner
Assistant Examiner—S. Joseph Morano
Attorney, Agent, or Firm—Stephen D. Carver; Jerry L. Mahurin

[57] ABSTRACT

A draw bar replacement strap and method for temporarily coupling and moving a disabled railroad car without actuating the drawbar. The strap comprises an elongated, multi-section, multi-ply body extending between a terminal two ply eye through which the strap may be looped and a remote tail. The strap is integrally formed from an elongated, single ply that is appropriately looped and folded. A ratchet system is attached to the strap for tightening. An auxiliary pad is provided for preventing abrasion of the strap when deployed, and for restraining the strap when stored. A multiple ply section forms the eye and extends from the eye to an end journalled to the ratchet. An elongated, double ply body section extends between the ratchet journal and the tail. Through the multi-ply multi-segment structure the tow strength of the cable is vastly improved. In the method the strap is coupled around the towing drawbar, and the tail and ratchet are drawn through the eye. The tail is wrapped over the wear pad and around a drawbar of the disabled car, passing through the slot in the ratchet take up spool until the multi-ply body portion of the strap contacts the take up spool. Optionally the strap may be looped about a captivated ring.

16 Claims, 6 Drawing Sheets

TEMPORARY DRAWBAR REPLACEMENT STRAP AND METHOD

BACKGROUND OF THE INVENTION

The present invention broadly relates to methods and apparatus for moving railroad cars. More particularly, my invention relates to cables or straps capable of temporarily substituting for defective draw bars during railroad car maneuvering. The invention pertains to art classified in U.S. Class 213, subclass 67R and Class 224, subclass 58.

Modern railroad cars are coupled together by complex draw bar systems. When these draw bars fail, a section of the train or an individual car must be serviced. Stranded or disabled cars are often moved out of the way of traffic onto a siding. They must be moved out of the way of traffic as soon as possible for safety and efficiency. Temporary maneuvering of railroad cars is conventionally effectuated by heavy tow chains.

Chains can be cumbersome and difficult to work with, particularly in cold, dark and rainy conditions. While chains have very high tensile strengths they are relatively brittle, making them somewhat unreliable when exposed to the violent forces caused by the take-up of slack as a train begins to move. In other words, when a disabled car is hooked to the operative portion of a train by chains, as the slack between the cars is taken up, the force of the locomotive is amplified as it travels through the cars to the chains holding the disabled car. Therefore, a sudden jerk is exerted on the chains increasing the likelihood of their immediate or subsequent failure.

When chains break, flying metal can injure bystanders. The dangerous whipping effects of a snapped tow chain are well known. Replacement of the chains by steel cables is inappropriate for the same reasons. When steel cables fail, the whipping motion is even more severe. Even where the temporary hook-up proceeds smoothly, chains take significant time to install and then remove. Because of the tremendous pull forces involved, metal parts can bind and become stuck, complicating the removal process. A more reliable, and easier-to-use replacement for the conventional heavy metal tow chain is thus desirable.

These disadvantages, coupled with the great weight of high strength chains and the difficulty in managing high strength cables as well as the time required to deploy such cables, begs for a more appropriate, safer, lighter-weight, easily deployed system to move disabled railroad cars.

Webbing straps are well know to the art of towing and/or load binding. Webbing straps have long been employed for the towing of automobiles, trucks, and particularly off-road vehicles. Furthermore, webbing straps have been used to secure loads in the trucking industry, airline industry, and by individuals, for quite some time. Reese, U.S. Pat. No. 3,955,734 discloses a tow strap assembly which is adjustable and has adjustable eyes on either end. The nature of the adjustments for this strap allows the strap to be looped back around itself several times and employs mechanical clamps and other keeper systems to dispose the strap at a user selected length. The military air services have employed webbing straps not only to strap down and hold loads, but also to pick-up loads from the ground in order to hoist them into fixed as well as rotary wing aircraft.

However, the use of webbing straps in the railroad industry is somewhat limited. Hanula, U.S. Pat. No. 4,635,804 discloses the use of a yoke to couple railroad cars using two straps. This yoke calls for the metallic portion of the yoke itself and a bridge to bear the loads where the strap contacts elements of the railroad cars.

As mentioned above it is therefore desirable to develop a strap of relatively light-weight yet high tensile strength that can be employed to temporarily couple a disabled railroad car to the operative portion of a train. If failure were to occur, such a strap would not suddenly snap, but rather it would more-slowly tear apart. When it does break the light-weight nature of the strap prevents it from developing the momentum present in a chain or cable which has suddenly failed. Another significant advantage of a strap system would be that it would be relatively adjustable. Furthermore, a strap system would afford a more flexible connection than chains. In other words, the strap would give rather than fail when subjected to a sever sudden shock. Such shocks are common when trains first start up as the locomotive pulls the slack from each coupling. This shock has an a cumulative effect as it passes down the train from the locomotive. Therefore, if the temporarily coupled disabled cars were near the end of the train the shock forces would be too great for the relatively brittle chain to endure. Conversely, the strap assembly would stand a better chance of giving and holding when the shock was encountered.

Even though fabric straps have advantages over tow chains, no prior fabric strap of which I am aware has ever worked reliably in the railroad environment. The strap must be carefully constructed to work at all. Notwithstanding the strap's construction, it must be carefully and precisely bound about the disabled draw bar sections to avoid snapping.

SUMMARY OF THE INVENTION

I have invented a fabric strap for temporarily coupling railroad cars together that endures the extreme forces generated during towing My new strap, although similar at first glance to prior are tow straps used for cars, is based upon my special design generated after years of testing. Through my strap, conventional tow chains, cables or wires can be avoided, The strap is preferably constructed of a high grade webbing material. The entire strap is constructed from a single length of material folded to produce multiple-ply sections including an eye. The strap due to its multi-ply construction and superior material qualities is ideally suited to act as a temporary draw bar replacement.

A take-up ratchet is secured midway upon the strap. This ratchet is of a fairly conventional configuration employing a frame mounting a take-up spool and a handle pivotally attached to the frame for advancing the take-up spool. Double-acting dogs secure the take-up spool from counter rotation. Furthermore, the handle employs a locking tab to hold one of the dogs into place and a flange on the frame to release the dog and allowing the take-up spool to free spool.

The wear pad is made of webbing material similar to that of the strap. It employs a two-piece velcro securing belt that facilitates securing the pad on a disabled car, and to facilitate securing the pad about the rolled up strap and take-up ratchet for storage and transport.

The method for use of the Temporary Draw bar Replacement System begins with deployment of the strap. The end of the strap having the eye is placed over the top of the draw bar of the means to move the disabled car, the operative car. Then, the tail end of the strap, the end opposite the eye, is passed through the eye. The extended ratchet is then pulled through the eye and the handle of the ratchet tugged to tighten the strap around the draw bar of the operative car.

Proceeding to the disabled car, the wear pad is placed around its carrying iron. If the carrying iron is missing, the draw bar keyhole can be used. The pad is intended to cover any sharp edges on the backside of the carrying iron or the keyhole.

At this point the operative car is backed into close proximity of the disabled car. The tail end of the strap is then passed through or around the portion of the disabled car where the wear pad was disposed.

Returning with the tail of the strap to the operative car, the tail end of the strap is passed through the slot in the take-up spool of the take-up ratchet. The strap is pulled through until the multi-ply portion of the strap abuts the spool. The handle of the ratchet is operated until the take-up spool is full and the strap tight. Then the ratchet handle is folded over to a position adjacent the frame of the take-up ratchet to secure the take-up spool. The disabled car can now be moved.

The strap once it is deployed forms a unitary towing structure in which a single ply of the strap is never deployed to take any weight. Furthermore, since the strap is constructed of a single length of webbing, folded back along itself all tensile forces are transferred along the entire length of the strap. The primary threat to the integrity of the strap, abrading, is diminished by the use of the wear pad and the multiple ply nature of the portions of the strap contacting the cars. Therefore, overall, this system is much more reliable and safer than chains. Furthermore, the present system has the added advantage of being relatively lightweight when compared to chains.

The cars may be uncoupled by releasing the take-up spool. This is accomplished by rotating the handle to the fully extended position. This releases the dogs securing the take-up spool allowing the strap to be unspooled from it.

The tail end of the strap is then passed back over carrying iron or through the keyhole of the disabled car. The pad is removed. Then the extended ratchet is passed through the eye of the strap followed by the tail.

The strap and ratchet can then be rolled up together. The pad is then wrapped around them and secured by the velcro belt.

Therefore, a primary object of my invention is to provide a temporary, reusable fabric strap to tow disabled railroad cars.

Another object is to provide a resilient fabric strap of the character described that replaces heavy chains with a light-weight, high-tension strap.

A related object of the present invention is to provide a safe easy means to keep a train moving when necessary.

Another object of the present invention is to provide a light-weight means to couple a disabled railroad car to a operative train or locomotive.

More particularly, an object of the present invention is to provide a draw bar replacement system which weighs approximately eleven pounds.

An object of the present invention is to provide a draw bar replacement system which hold the disabled car secure to an operative train or locomotive and is not subject to the whipping motions associated with chains.

A related object of the present disclosure is to provide a means to couple two rail road cars that can withstand the sudden loading imposed on such a connection when the slack of the train is taken up by the locomotive.

A further related object of the present invention is to provide a temporary draw bar replacement system which upon failure does not create the dangers present when chains or cables fail under heavy tensile loads, namely whipping action by free ends of the chains or cables.

A secondary object of the present invention is to provide a temporary draw bar replacement system which is compact and can be entirely self-contained.

Another object of the present invention is to provide a temporary draw bar replacement system which is length adjustable.

Another secondary object of the present invention is to provide a temporary draw bar replacement system which can alternatively act as a "come-along" system.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
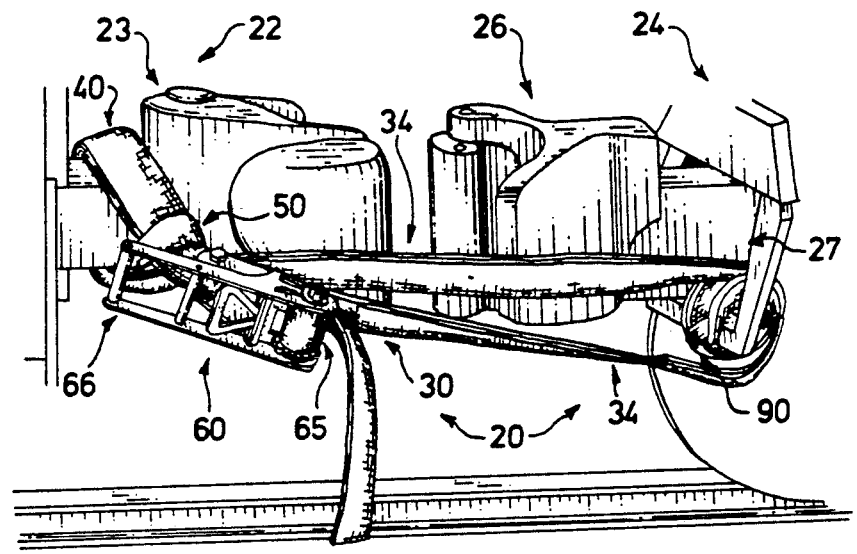
FIG. 1 is a fragmentary perspective view of my Temporary Draw bar Replacement Strap developed between a disabled railroad car and the draw bar of a prime mover.

Turning now to the drawings, the best mode of my Temporary Draw bar Replacement Strap is broadly designated by the reference numeral 20. Dysfunctional railroad cars 24 often need to be moved at least a short distance either to receive maintenance or to clear the way for other cars or operations. The conventional method to move such a car 24 employs chains hooked from an operative car 22 to the disabled car 24. The disclosed system replaces chains with a light-weight, high-tension, webbing strap 30. It may be used to practice the method illustrated in FIGS. 5-16.

Figure 4:
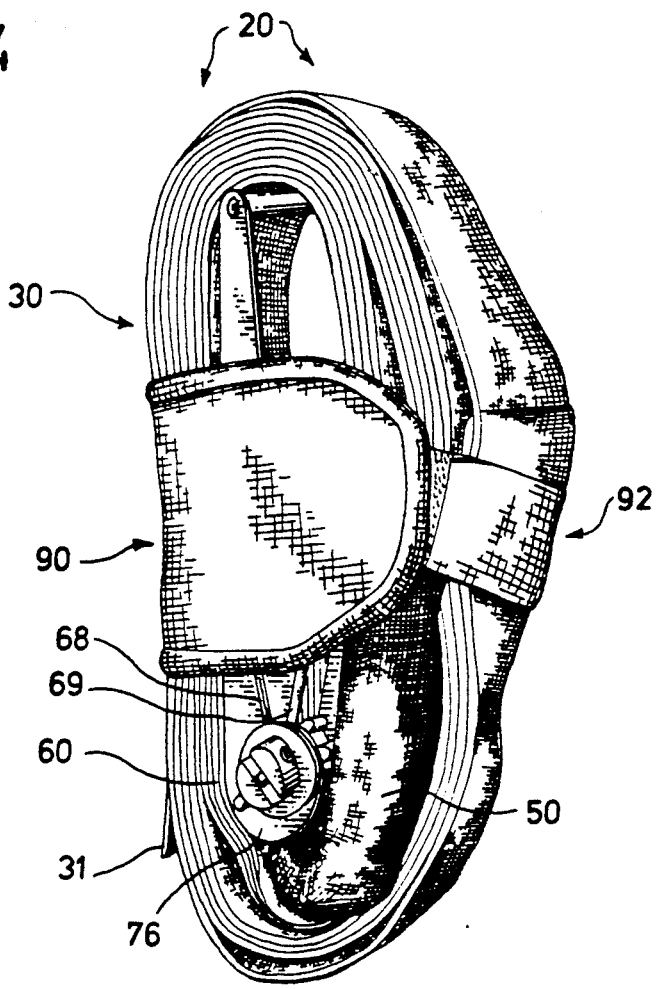
FIG. 4 is a perspective view of the strap disposed in its storage and transportation configuration.
Figure 5:
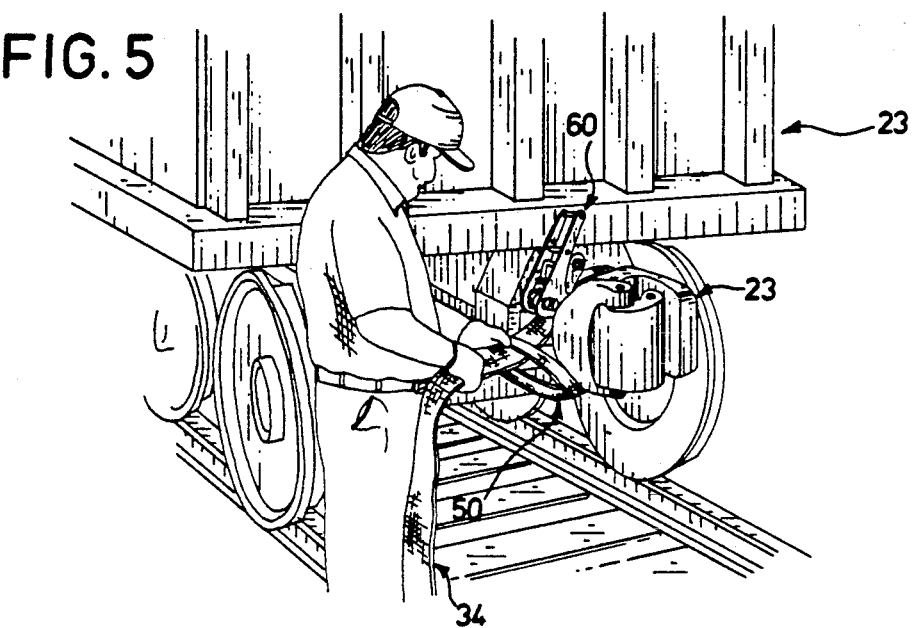
FIG. 5 is a fragmentary perspective view illustrating an initial installation step.
Figure 6:
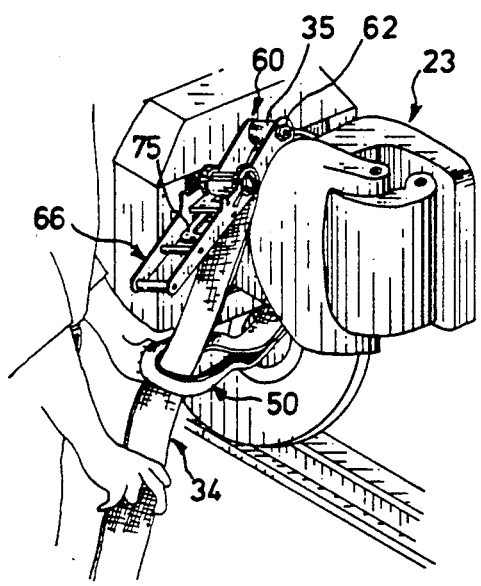
FIG. 6 is a fragmentary perspective view illustrating a subsequent installation step.

The system comprises a draw bar replacement strap 30, a take-up ratchet 60 for operating an associated take-up spool 65, and a wear pad 90. As illustrated in FIG. 1 all three elements function together. As illustrated by FIG. 4 when stored, the pad 90 acts as a binding element to hold the strap 30 and the connected ratchet 60.

Figure 2:
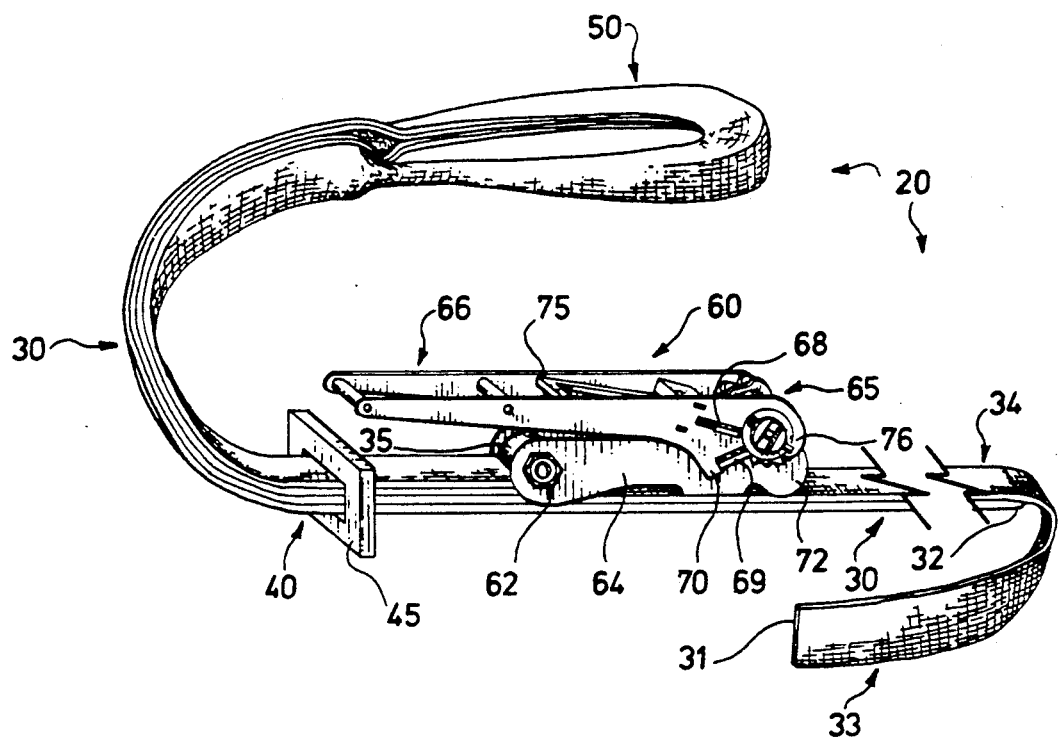
FIG. 2 is an fragmentary perspective view of the preferred strap.

The strap 30 is preferably constructed of a high grade webbing material. Turning to FIG. 2 it will be seen that the entire strap 30 is constructed from a single length of material folded to produce multiple-ply sections. These sections include a single ply tail section 33, an intermediate two ply section 34, a four ply section 40 and a longitudinally folded two ply eye 50. All sections 33, 34, 40 and 50 comprise folded or adjacent sections of the same unitary strap.

The strap 30 is folded in such a manner that the second end 32 of the strap 30 is disposed near the first end 31. The two ply section 34 thus created is stitched together. The new end created by the fold is once again doubled back on the strap 30 toward the first and second ends 31 and 32. It is secured along the strap 30 in such a manner to created a small loop forming a journalled end 35 at the point of the original fold. The ratchet 60 is secured to the strap 30 by a mandrel bolt 62 passing through the journalled end 35. The four plies now adjacent to one another are secured along their length to a point short of creating a second fold. They are secured by stitching running along the length of the four ply section 40 as well as stitching running perpendicular to the strap 30. Therefore, by stitching only part of the four ply section an eye 50 is formed opposite the first and second end 32. The two plies of the eye 50 are folded along their length and stitched together.

A strain relief ring 45 is captivated upon the four ply section 40. Preferably the plastic coated ring 45 defines a rectangular opening penetrated by section 40. The ring 45 freely slides on the strap between the eye 50 and the take up ratchet 60.

The take-up ratchet 60, as mentioned above, is secured to the journalled end 35 of the strap 30. Ratchet 60 comprises a frame 64 mounting a take-up spool 65 and an anchoring mandrel bolt 62. This anchoring mandrel bolt 62 passes through the Journalled end 35 of the strap 30. Other components of the take-up ratchet 60 include a handle 66 pivotally attached to the frame 64 for advancing the take-up spool 65 by means of gears 67 disposed about the outer radius of the take-up spool 65. Double-acting dogs 68 and 69 secure the take-up spool 65 from counter rotation. Furthermore, the handle 66 employs a locking tab 70 to hold one of the dogs 69 into place when the handle 66 is folded all the way down adjacent to the frame 64 of the take-up ratchet 60, as illustrated in FIG. 2. When the handle 66 is full extended in the opposite direction the second dog 68 is pushed by a flange 72 on the frame 64 releasing the dog 68 and allowing the take-up spool 65 to free spool.

Figure 3:
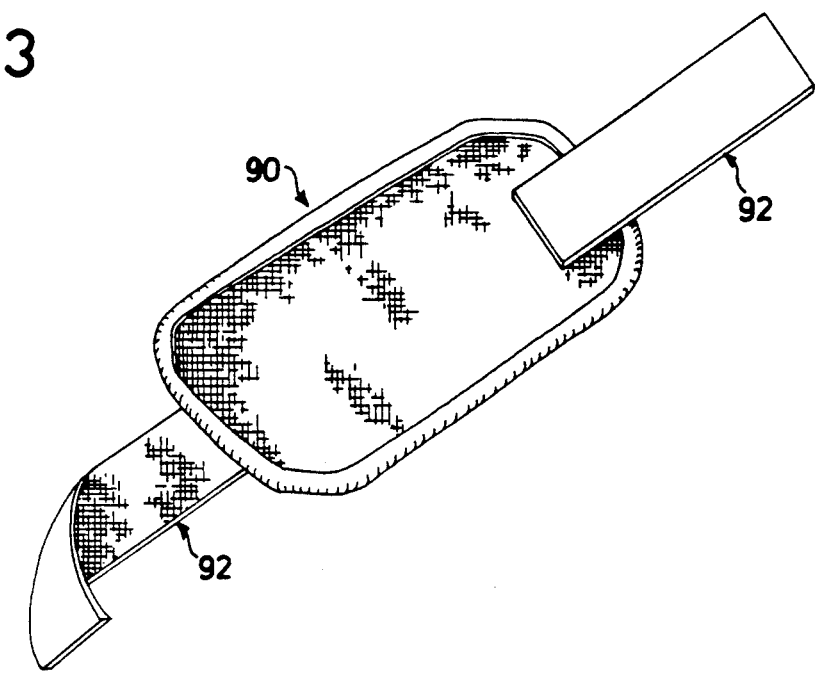
FIG. 3 is an enlarged isometric view of the preferred wear pad.

Turing to FIG. 3, the wear pad 90 is made of webbing material similar to that of the strap 30. However, it is approximately three times the width of the strap 30 to facilitate padding the strap 30. The width also allows the strap 30 to shift somewhat from its original position when deployed on the pad 90. Furthermore, the pad 90 employs a two-piece Velcro ™ securing belt 92 that facilitates securing the pad 90 on a disabled car 24, and to facilitate securing the pad 90 about the rolled up strap 30 and take-up ratchet 60 for storage and transport, see FIG. 4.

As illustrated in the method description below, the strap 30 due to its multi-ply construction and superior material qualities is ideally suited to act as a temporary draw bar replacement.

The above disclosed apparatus is well suited to temporarily couple a disabled railroad car 24 to a locomotive, train or other motive means on the same track. This coupling facilitates moving the car 24 a short distance such as to a siding or to an area where the disabled car 24 may be repaired.

The first step is to place the end of the strap 30 having the eye 50 over the top of the draw bar 23 of the locomotive, train or other means to move the disabled car 24, herein after referred to as the operative car 22. Then, the bitter or tail end 31 of the strap 30, the end opposite the eye 50, is passed downwardly through the eye 50, see FIGS. 5 and 6.

Figure 7:
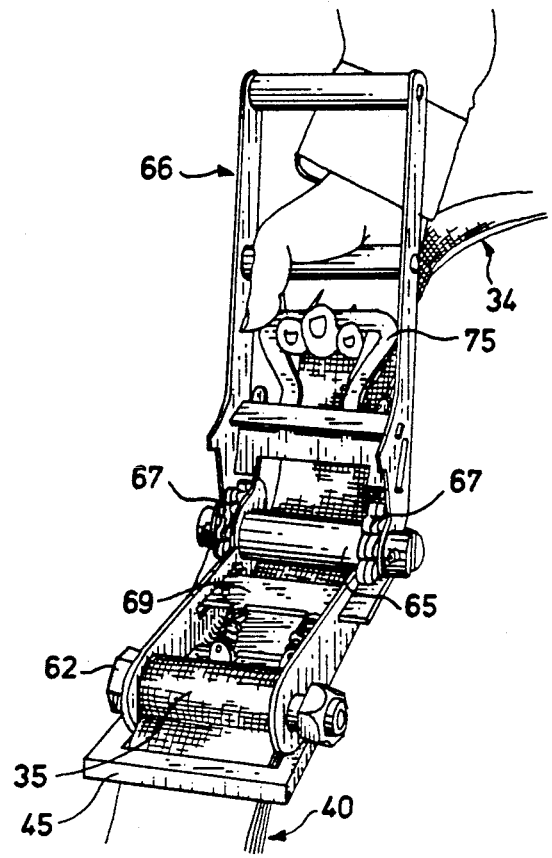
FIG. 7 is a fragmentary perspective view illustrating positioning of the ratchet handle for deployment of the take-up ratchet as required by the steps illustrated in FIGS. 6, 8 and 9.
Figure 8:
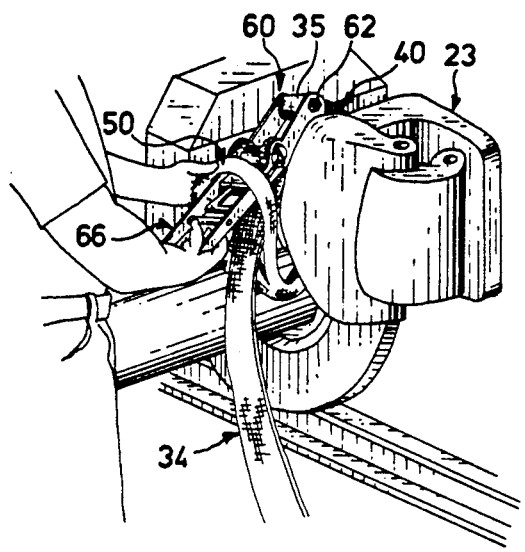
FIG. 8 is a fragmentary perspective view illustrating the step of passing the take-up ratchet through the eye of the strap.

As the attached take-up ratchet 60 is reached the ratchet 60 must be released into a flat position by extending the handle 66 as far away from the frame 64 as possible see FIG. 7.

Figure 9:
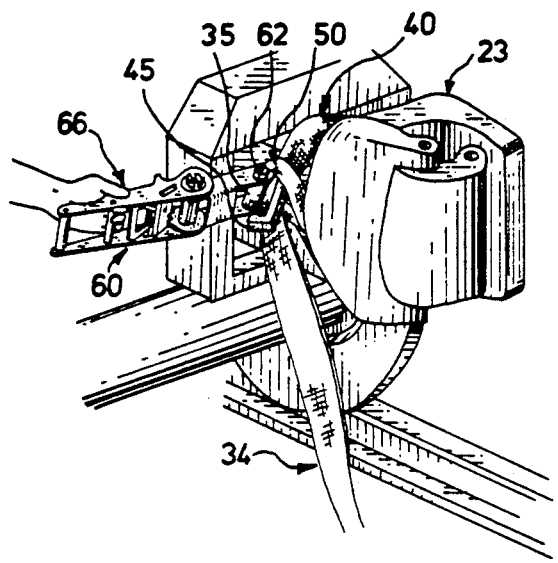
FIG. 9 is a fragmentary perspective view illustrating the step employed to tighten the system subsequent to completion of the step illustrated in FIG. 8.
Figure 10:
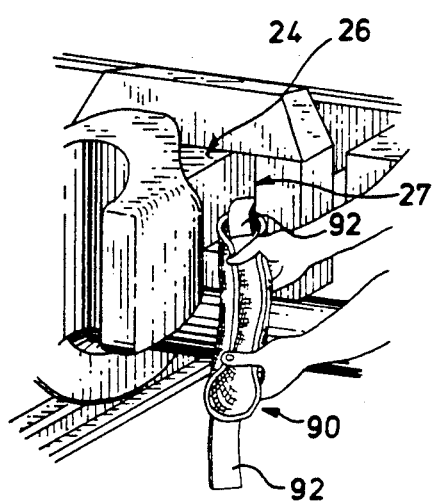
FIG. 10 is an fragmentary perspective view illustrating preferred positioning of the optional wear pad on the disabled car.
Figure 11:
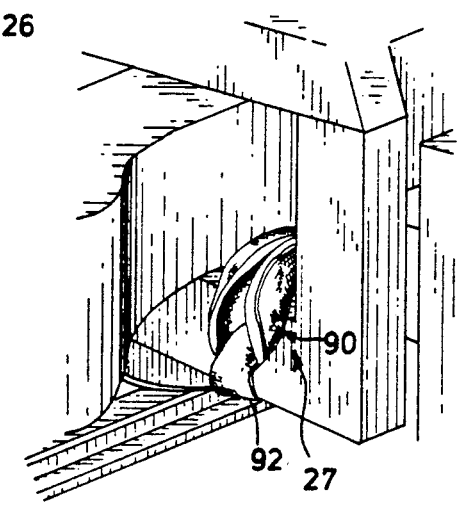
FIG. 11 is a fragmentary perspective view illustrating the final position of the wear pad.

The ratchet 60 is then pulled through the eye 50 (FIG. 8) and the handle 66 of the ratchet 60 tugged to tighten the strap 30 around the draw bar 23 of the operative car 22 (FIG. 9).

Next, the wear pad 90 is placed around the carrying iron 26 of the disabled car 24 If the carrying iron 26 is missing, the draw bar keyhole 27 can be used. The pad 90 should cover any sharp edges on the backside of the carrying iron 26 or the keyhole 27.

Figure 12:
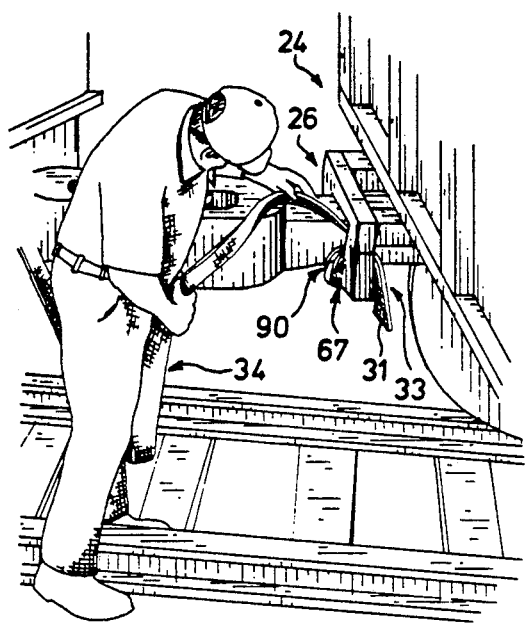
FIG. 12 is a fragmentary perspective view illustrating the step of passing the tail of the strap through the disabled car, over the wear pad.
Figure 13:
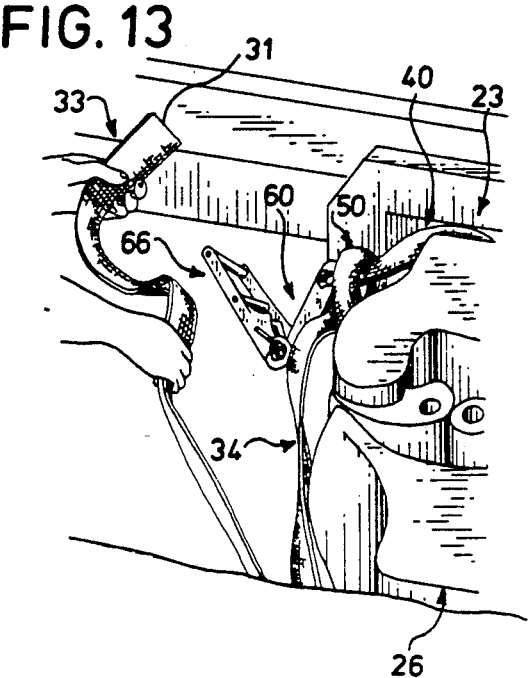
FIG. 13 is a fragmentary perspective view illustrating the return of the strap to the location of the take-up ratchet.

At this point the operative car 22 is backed into close proximity of the disabled car 24. The tail end 31 of the strap 30 is then passed through or around the portion of the disabled car 24 where the wear pad 90 was disposed (FIG. 12). The tail end 31 is then conducted to the location of the take-up ratchet 60 (FIG. 13).

Figure 14:
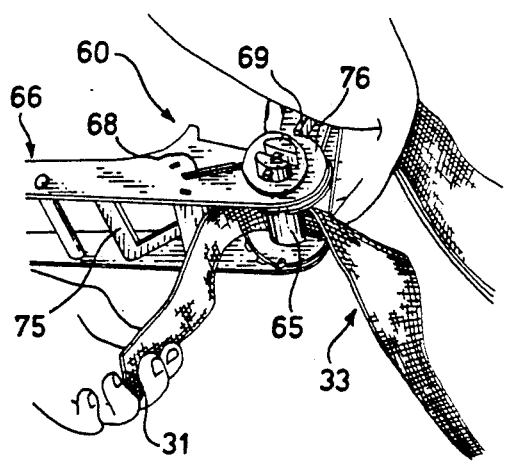
FIG. 14 is a fragmentary perspective view illustrating insertion of the strap into the take-up ratchet.
Figure 15:
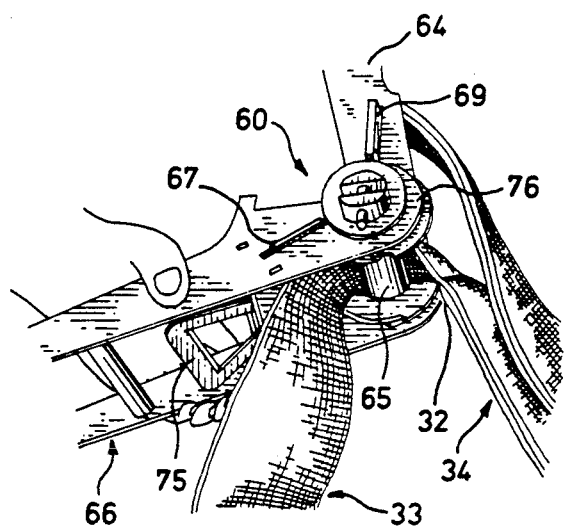
FIG. 15 is a fragmentary perspective illustrating final positioning of the strap in the take-up ratchet.

The tail end 31 of the strap 30 is then passed through the slot in the take-up spool 65 of the take-up ratchet 60 (FIGS. 14 and 15). This slot is wide enough to allow the single ply section 33 of the strap to pass through yet too narrow to allow the two ply section 34 to enter. The strap 30 should be pulled through the take-up spool slot until the two ply portion 34 (the second end 32 of the strap 30) abuts the spool 65.

Figure 16:
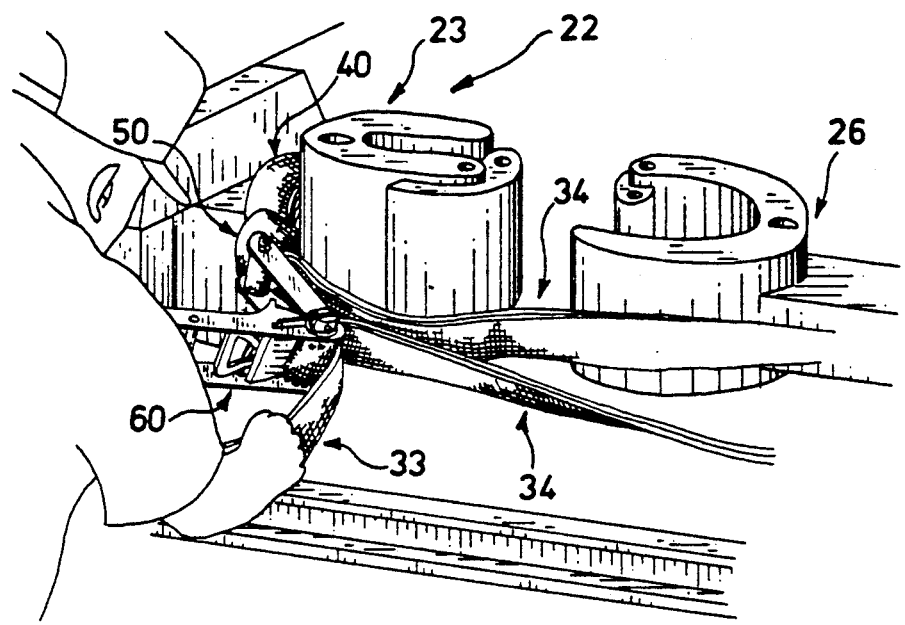
FIG. 16 is a fragmentary perspective view illustrating an operator working the take-up ratchet to tighten the strap; and, FIG. 17 is a top plan view of the take-up ratchet illustrating the locked position of the ratchet handle.
Figure 17:
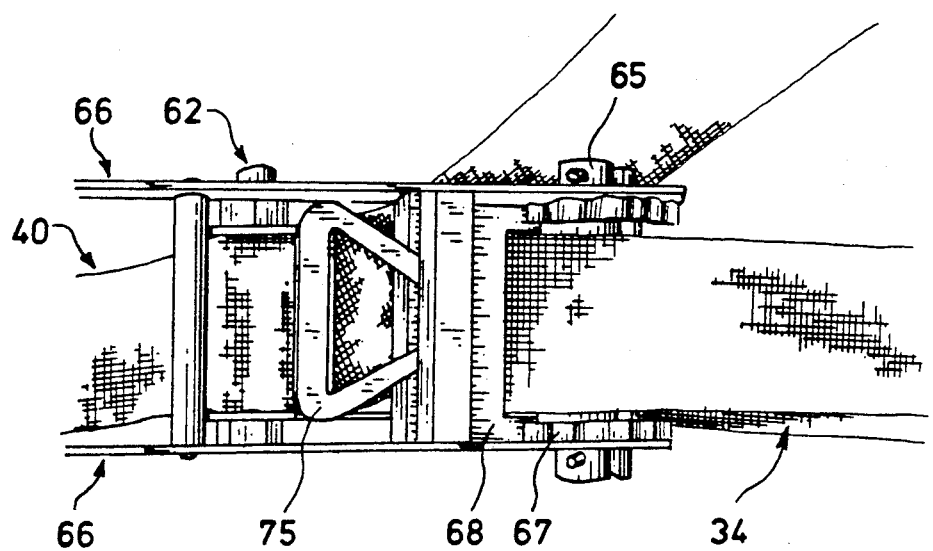

Holding the tail end 31 of the strap 30 to insure that the two-ply section 34 of the strap 30 is held tight against the take-up spool 65, the handle 66 of the ratchet 60 is operated until the take-up spool 65 is full and the strap 30 tight (FIG. 16). Then the ratchet handle 66 is folded over to a position adjacent the frame 64 of the take-up ratchet 60. The release handle is secured in locking engagement with the teeth of the take-up spool 65, see FIG. 17.

The proper configuration of the assembly is illustrated in FIG. 1. If the distance between the cars 22 and 24 is too great or the draw bar 25 is missing from the disabled car 24 the strap 30 may be wrapped around the carrying iron 26 of the disabled car 24 twice to minimizes the distance between the cars 22 and 24.

Once the disabled car 24 has been moved to the desired location the cars 22 and 24 may be uncoupled by removal of the system. To do so the operator must release the take-up spool 65 by rotating the handle 66 to the fully extended position. This is done by squeezing the release hand 75 (FIG. 7) and then rotating the ratchet 60 handle 66. When the ratchet handle 66 is at its full extended position, the primary dog 69 of the take-up spool 65 releases due to a camming surface 75 of the handle 66 contacting the primary dog 69. The dog 68 associated with the handle is disengaged by the flange 72 on the frame 64. Therefore, the take-up spool 65 is released allowing the strap 30 to be unspooled from it.

The tail end 31 of the strap 30 is then passed back over carrying iron or through the keyhole of the disabled car 24. The pad 90 is removed. Then the ratchet 60 with its handle 66 still fully extended is passed back through the eye 50 of the strap 30 followed by the tail end 31.

As shown in FIG. 4 the strap 30 can then be rolled up with the eye 50 rolled around the take-up ratchet 60 and then the remaining strap 30 wrapped around the eye 50 and ratchet 60. The pad 90 is then wrapped around the entire assembly and secured by the velcro securing belt 92.

As illustrated by the above description the strap 30 once it is deployed forms a unitary towing structure in which a single ply of the strap 30 is never deployed to take any weight. Furthermore, since the strap 30 is constructed of a single length of webbing, doubled back upon itself all tensile forces are transferred along the entire length of the strap 30. The primary threat to the integrity of the strap 30 is abrading along sharp edges on the railroad cars 22 and 24. This danger is diminished by the use of the wear pad 90 and the multiple ply nature of the portions of the strap 30 contacting the cars 22 and 24. Therefore, overall, this system is much more reliable and safer than heavier chains.

Additionally, the strain relief ring 45 may be employed to provide further strength to the deployed system 20. Specifically when the tail 31 of the strap 30 is returned to the operative car 22 it can be fed through the ring 45 and returned to the disabled car 24, fed through the keyhole 27 and back to the ratchet 60 for attachment.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown int eh accompanying drawings is to be interpreted as illustrative and not in a limiting sense.

What is claimed is:

1. A draw bar replacement system for temporarily coupling a first railroad car to a second railroad car without actuating either draw bar, said system comprising:
    an elongated, multi-section pull strap extending between a terminal eye and a tail, said strap integrally formed from a single ply and comprising:
        a multiple ply section comprising said terminal eye and extending from said terminal eye to a journalled end; and,
        an elongated, double ply body section extending between said tail and said journalled end;
    ratchet means for tightening said pull strap, said ratchet means captivating said journalled end; and,
    pad means for preventing abrasion of said strap when deployed and for restraining said strap when store.

2. The temporary draw bar replacement system defined in claim 1 further comprising strain relief means captivated upon said multiple ply section for distributing force.

3. The temporary draw bar replacement system defined in claim 2 wherein said pad means comprises a webbing area between fabric securing means for releasably cinching said pad.

4. The temporary draw bar replacement system defined in claim 1 wherein said sections of said strap are formed by a single folded layer of a webbing fabric of a predetermined length.

5. A draw bar replacement system for temporarily coupling a first railroad car to a second railroad car without actuating either draw bar, said system comprising:
    an elongated, multi-section pull strap extending between a terminal two ply eye and a remote tail, said strap integrally formed from a single ply and comprising:
        a multiple ply section formed from four folded layers of said single ply, said multiply ply section comprising said terminal eye and extending from said terminal eye to a journalled end; and,
        an elongated, double ply body section formed from twin folded layers of said single ply and extending between said tail and said journalled end;
    ring means captivated upon said pull strap to receive said tail;
    ratchet means for tightening said pull strap, said ratchet means captivating said journalled end with a rotation mandrel looped by said single ply; and,
    pad means for preventing abrasion of said strap when deployed and for restraining said strap when store.

6. The temporary draw bar replacement system defined in claim 5 further comprising strain relief means captivated upon said multiple ply section for distributing force.

7. The temporary draw bar replacement system defined in claim 6 wherein said pad means comprises a webbing area between fabric securing means for releasably cinching said pad means.

8. The temporary draw bar replacement system defined in claim 5 wherein said single ply forms said tail, extends to said journalled end, extends along said four ply section and around said eye to said journalled end forming the outermost layers of said eye, extends around said journalled end and around said eye again to form an inner eye layer, returns along said four ply section as an inner layer without looping said journal, and returns to said tail forming said double ply section.

9. The temporary draw bar replacement system defined in claim 5 further comprising strain relief means captivated upon said multiple ply section for distributing force.

10. The temporary draw bar replacement system defined in claim 9 wherein said pad means comprises a webbing area between fabric securing means for releasably cinching said pad means.

11. The temporary draw bar replacement system defined in claim 9 wherein said terminal two ply eye is transversely folded to form four plies.

12. A method for transporting a railroad car by temporary replacement of a draw bar comprising the steps of:

providing motive means for moving a disabled railroad car on the same track as said disabled car;

deploying an elongated, multi-section pull strap integrally formed from a single ply, said strap comprising:
 a terminal eye;
 a remote tail;
 a ring captivated upon said strap;
 a multiple ply section formed from four folded layers of said single ply, said multiple ply extending from said terminal eye to a journalled end;
 an elongated, double ply body section formed from twin folded layers of said single ply and extending between said tail and said journalled end; and
 ratchet means for tightening said pull strap, said ratchet means captivating said journalled end with a rotation mandrel looped by said single ply;

coupling said car to said motive means with said strap, said coupling step comprising the steps of:

drawing said strap over a draw bar of said motive means and feeding the tail through said eye;

drawing said tail and ratchet means through said eye;

wrapping said tail around a structural portion of said disabled car;

passing said tail through a take up spool of said ratchet means until said double ply body portion of said strap is in contact with said take up spool; and, ratcheting said take up spool until said strap tightens; and, moving said disabled car with said motive means.

13. The method as defined in claim 12 wherein said step of wrapping said tail around said draw bar includes the further step of looping said strap around said draw bar and through said ring.

14. The method as defined in claim 13 including the step of securing said ratchet means by releasing a dog means of said ratchet means and placing said handle in a locked position, thereby locking said take up spool.

15. The method as defined in claim 14 including the step of uncoupling said motive means from said car by removing said draw bar replacement system from said motive means and said car; said removal step comprising the steps of:

releasing said take up spool by rotating said handle to its greatest extent opposite the locked position;

unspooling the strap from said take up spool;

passing the tail end of said strap back around said draw bar or back through said orifice in said car;

recovering the pad;

passing the ratchet through the eye of the strap; and, passing the tail end of the strap through the eye.

16. The method as defined in claim 14 including the step of wrapping said strap with said pad and securing said strap with fabric securing means for releasably cinching said pad.

* * * * *